United States Patent
Bull et al.

(10) Patent No.: US 8,447,567 B2
(45) Date of Patent: May 21, 2013

(54) MEASURING LINE PERFORMANCE

(75) Inventors: Philip M Bull, Ipswich (GB); David M Rohlfing, Ipswich (GB)

(73) Assignee: British Telecommunications public limited company, London (GB)

( * ) Notice: Subject to any disclaimer, the term of this patent is extended or adjusted under 35 U.S.C. 154(b) by 150 days.

(21) Appl. No.: 12/935,383

(22) PCT Filed: Feb. 18, 2009

(86) PCT No.: PCT/GB2009/000435
§ 371 (c)(1),
(2), (4) Date: Sep. 29, 2010

(87) PCT Pub. No.: WO2009/122121
PCT Pub. Date: Oct. 8, 2009

(65) Prior Publication Data
US 2011/0029283 A1 Feb. 3, 2011

(30) Foreign Application Priority Data
Mar. 31, 2008 (EP) .................................... 08251221

(51) Int. Cl.
*H04M 1/24* (2006.01)
*H04M 3/08* (2006.01)
*H04M 3/22* (2006.01)

(52) U.S. Cl.
USPC ........................... 702/182; 702/183; 702/184

(58) Field of Classification Search
USPC ............... 702/182–184; 379/1.01, 1.03, 1.04, 379/22.08, 23.24, 27.08, 28, 30; 370/241, 370/242, 252, 253; 375/221, 222, 224; 703/2
See application file for complete search history.

(56) References Cited

U.S. PATENT DOCUMENTS

| | | | |
|---|---|---|---|
| 6,724,859 B1 | 4/2004 | Galli | |
| 2004/0095921 A1* | 5/2004 | Kerpez | 370/351 |
| 2006/0098725 A1* | 5/2006 | Rhee et al. | 375/222 |

FOREIGN PATENT DOCUMENTS

WO    WO 2006/092730    9/2006

OTHER PUBLICATIONS

International Search Report for PCT/GB2009/000435, mailed May 18, 2009.

* cited by examiner

*Primary Examiner* — Sujoy Kundu
(74) *Attorney, Agent, or Firm* — Nixon & Vanderhye P.C.

(57) ABSTRACT

A method of measuring the performance of a DSL line provides an indication of potential faults in the line. Analysis of broadband DSL is less straightforward than for other technologies, since "normal" behavior depends on a number of factors, including line length and line quality, where normal behavior for a long line could be regarded as poor for a short line. The data transmission characteristics of a DSL line under test are measured with reference to its upstream line attenuation, then the results are compared with the model for the corresponding data transmission characteristic. A performance measure is calculated for each characteristic indicative of the difference between the measured characteristic and the observed 'average' for other lines having the same upstream line attenuation. A final line performance indicator is calculated based on the combination of all the individual performance measures, which provides a quantitative measure of a line's performance.

12 Claims, 4 Drawing Sheets

MEASURING LINE PERFORMANCE

This application is the U.S. national phase of International Application No. PCT/GB2009/000435 filed 18 Feb. 2009, which designated the U.S. and claims priority to EP Application No. 08251221.1 filed 31 Mar. 2008, the entire contents of each of which are hereby incorporated by reference.

FIELD OF THE INVENTION

This invention relates to method of measuring the performance of a digital subscriber line, in particular a method of measuring the performance of a digital subscriber line by examining data transmission characteristics with respect to the upstream line attenuation and comparing against lines.

BACKGROUND TO THE INVENTION

Digital Subscriber Line (DSL) technology, often referred to as "broadband", is a family of services that provide digital data transmission over the metallic twisted copper pairs that form part of a local telephone network. DSL is commonly used to provide a customer's home with a network connection, typically to the Internet via an ISP.

DSL broadband lines are prone to faults. These include slow line speeds or line drop outs. Some of these faults are easily identified and rectified, such as missing micro-filters in the customer's home. Others are more complex, such as faults resulting from external RF interference or faulty cabling. Diagnostic methods have been developed to help identify the cause of such faults and to propose solutions.

Some methods look at the line statistics that are measured by the modem or at the exchange, such as the signal to noise ratio or line attenuation, and try and match them to known potential faults. More persistent problems or difficult to identify problems require more detailed investigation, sometimes with an engineer. However, even engineers with various testing tools at their disposal often struggle to identify some faults. Moreover, there is often an issue of whether there is an actual fault with the line or whether the symptoms observed are typical for similar lines.

SUMMARY OF THE INVENTION

It is the aim of embodiments of the present invention to provide an improved method of measuring the performance of a DSL line, and identifying problematic lines.

According to one aspect of the present invention, there is provided a method of identifying a fault on a digital subscriber line, the method comprising:
i) generating a model for each of a plurality of data transmission parameters based on measurements taken from a plurality of digital subscriber lines, wherein each model models the relationship between a data transmission parameter as a function of the upstream line attenuation;
ii) measuring the data transmission parameters and an upstream line attenuation associated with a test digital subscriber line;
and for each of the measured data transmission parameters
  a) determining an expected value for the measured data transmission parameter corresponding to the measured upstream attenuation using the model associated with said measured data transmission parameter; and
  b) calculating a parameter performance indicator based on the difference between the expected value and the measured value for the measured data transmission parameter; and then
  iii) calculating a line performance indicator for the test digital subscriber line based on the sum of the parameter performance indicators for each of the measured data transmission parameters.

Preferably, the parameter performance indicator is divided by the standard deviation of the expected value based on the model.

The models can be grouped according to service profiles, wherein each service profile defines a set of line conditions associated with the digital subscriber line.

The values of the measured parameters in the models may be separated into bins according to the measured upstream line attenuation. The values in each bin may be averaged and the averages are used to model the relationship between the associated data transmission parameter as a function of the upstream line attenuation. Preferably, regression analysis is used to model the average values for each data transmission parameter as a function of the upstream line attenuation.

According to a second aspect of the present invention, there is provided a network analysis module for identifying a fault on a digital subscriber line, the network module adapted to:
  generate a model for each of a plurality of data transmission parameters based on measurements taken from a plurality of digital subscriber lines, wherein each model models the relationship between a data transmission parameter as a function of the upstream line attenuation;
  receive data transmission parameters and an upstream line attenuation associated with a test digital subscriber line;
  and for each of the measured data transmission parameters
    a) determine an expected value for the measured data transmission parameter corresponding to the measured upstream attenuation using the model associated with said measured data transmission parameter; and
    b) calculate a parameter performance indicator based on the difference between the expected value and the measured value for the measured data transmission parameter; and
  calculate a line performance indicator for the test digital subscriber line based on the sum of the parameter performance indicators for each of the measured data transmission parameters.

BRIEF DESCRIPTION OF THE DRAWINGS

For a better understanding of the present invention reference will now be made by way of example only to the accompanying drawings, in which.

DESCRIPTION OF PREFERRED EMBODIMENTS

The present invention is described herein with reference to particular examples. The invention is not, however, limited to such examples.

In examples of the present invention, there is proposed a method of measuring the performance of a DSL line, which in turn provides an indication of potential faults in a line. Analysis of broadband DSL is less straightforward than for other technologies, since 'normal' behaviour depends on a number of factors, including line length and line quality, where normal behaviour for a long line could be regarded as poor for a short line. The data transmission characteristics of a DSL line under test are measured with reference to its upstream line attenuation, then the results are compared with the model for the corresponding data transmission characteristic. A performance measure is calculated for each characteristic indicative of the difference between the measured characteristic and the observed "average" for other lines having the same upstream line attenuation. A final line performance indicator (LPI) is calculated based on the combination of all the individual performance measures, which provides a quantitative measure of a line's performance.

Figure 1:
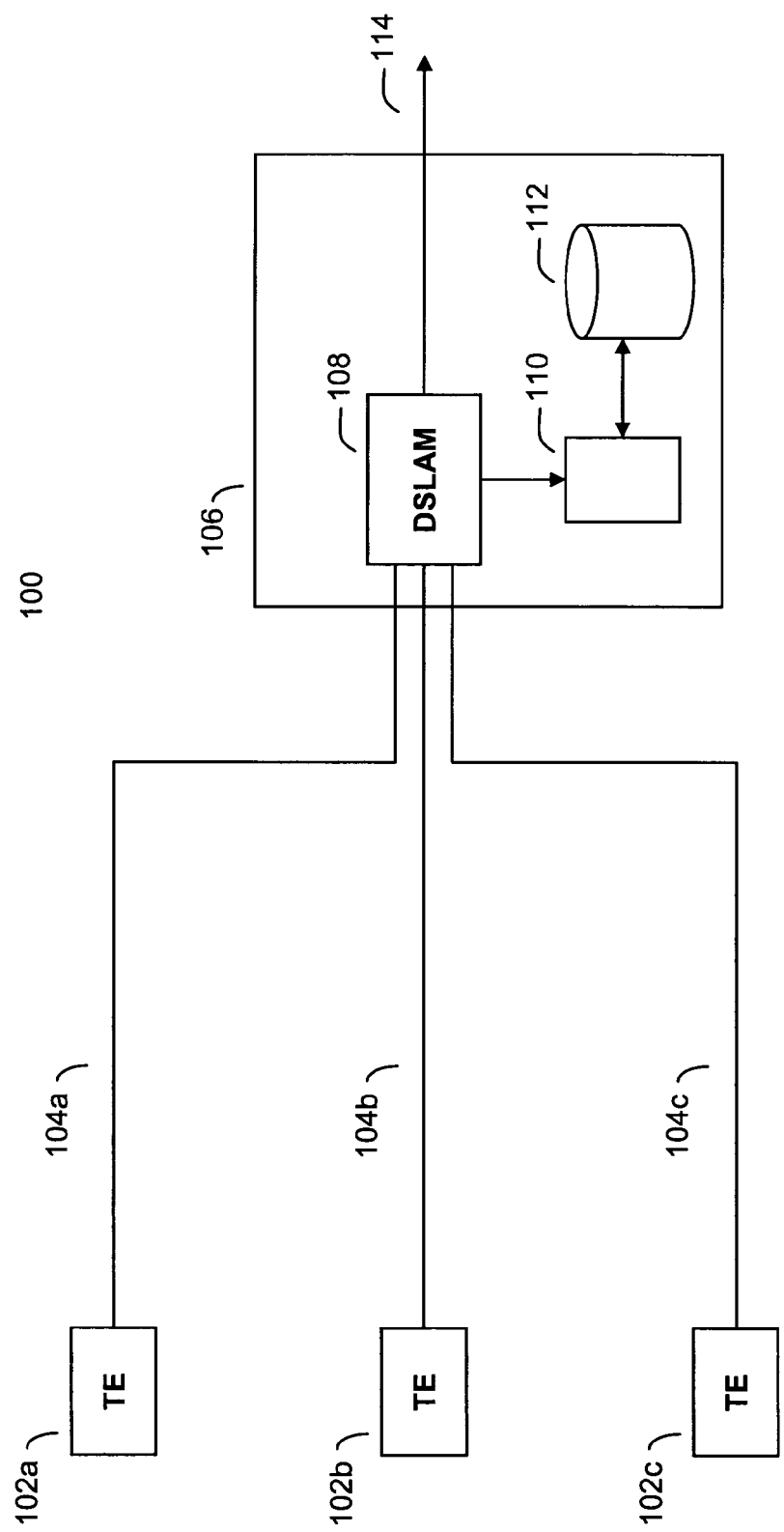
FIG. 1 is schematic of a part of a telecommunications network in an example of the present invention.

FIG. 1 illustrates part of a telecommunications network 100 in an example of the present invention. The network 100 comprises terminal equipment TE 102a, 102b and 102c, such as modems, each of which are connected to a local telephone exchange 106 via respective DSL lines 104a, 104b and 104c. DSL line 104a will be referred to hereinafter as Line_A, DSL line 104b as Line_B and DSL line 104c as Line_C for simplicity.

The TEs are located in individual customer's premises/homes. The DSL lines terminate at a digital subscriber line access multiplexer, DSLAM, 108 in the local exchange 106, and provide each associated premises with a "broadband" network connection. At the exchange 106, there is also provided a line management module 110 connected to the DSLAM which monitors the link characteristics of each of the DSL lines and stores the results in a data store 112 connected to the line management module 110. The line management module 110 is also configured to calculate a measure of the performance of each DSL line using the monitored characteristics.

The method of determining the performance of a DSL line is implemented in two phases: a model building phase and a line performance calculation stage.

In the model building phase, a large number of DSL lines are sampled (typically in the order of hundreds of thousands), and "model" data associated with each line is gathered. The data is obtained from a range of line parameters associated with the DSL line. The line parameters used are described later below. The measured parameters for each line are then gathered into separate bins and plotted against the upstream line attenuation associated with each line. Finally, models are built for each parameter based on the resulting plots using regression analysis, so that for a line having a given upstream line attenuation, there is an associated expected value for each line parameter.

Once the models are built, a DSL line can be tested by measuring line parameters associated with that line, and using the measured upstream attenuation as a reference to each of the models to determine the predicted line parameter values. The difference between the predicted and actual parameter values are then used to calculate individual performance indicators associated with that parameter.

So, looking first at the modelling phase, Table 1 below shows a list of the parameters measured and based upon which models are generated.

TABLE 1

| Parameter name | Calculate bin average? | Calculate bin standard deviation? |
| --- | --- | --- |
| DNSTR_LINE_ATTN | yes | yes |
| UPSTR_LINE_ATTN | no - used as base for model | no - used as base for model |
| DNSTR_MAX_ATTIN_DATARATE | yes | yes |
| UPSTR_MAX_ATTIN_DATARATE | yes | yes |
| CODE_VIO_LINE_NREND | no - fixed 0 | yes |
| CODE_VIO_LINE_FREND | no - fixed 0 | yes |
| FEC_SEC_LINE_NREND | no - fixed 0 | yes |
| FEC_SEC_LINE_FREND | no - fixed 0 | yes |
| LOSS_OF_FRM_SEC_FREND | no - fixed 0 | yes |
| LOSS_OF_FRM_SEC_NREND | no - fixed 0 | yes |
| LOSS_OF_LINK_SEC | no - fixed 0 | yes |
| INIT_FULL_INITIAL | no - fixed 0 | yes |
| INITFAIL_FLD_FULL_INITIAL | no - fixed 0 | yes |
| DOWNSTR_SN_RATIO_MRGN | yes | yes |
| UPSTR_SN_RATIO_MRGN | yes | yes |
| DOWNSTR_LINE_RATE | yes | yes |
| UPSTR_LINE_RATE | yes | yes |
| UPTIME_TOT_SYNC_TIMEINSEC | no | yes |

Thus, each parameter listed above is measured periodically by the DSLAM 108 and/or the terminal equipment associated with the DSL line being measured. The measured parameters are gathered by the line management module 110 and stored in the data store 112. The measurements are captured periodically, typically every 15 minutes, at the DSLAM or at the terminal equipment and then processed at longer intervals to generate the models. The model generation typically occurs every month once sufficient modelling data has been gathered.

Each parameter term is explained in more detail as follows.

"Upstream" relates to the data channel from the modem to the DSLAM. "Downstream" relates to the data channel from the DSLAM to modem. "Near end" are values as observed at the DSLAM end of the line. "Far end" are values as observed at the terminal equipment or modem end of the line.

Line attenuation—the amount of signal lost through attenuation whilst traversing the upstream/downstream channel.

MAX_ATTIN_DATARATE—is an estimate of the maximum attainable line rate calculated by the modem/DSLAM for the downstream/upstream channels.

CODE_VIO_LINE—a count of the number of bit level (code violation) errors that occurred in the data stream (i.e. the code representing the redundancy check calculated before and after transmission were different). Counts are taken at both near end and far end of the line.

FEC_SEC_LINE—the number of seconds in a given period that the forward error correction algorithm could not correct the transmission errors. Evaluated at both the near end and far end of the line.

LOSS_OF_FRM_SEC—the number of seconds in a given period where the whole (ATM) frame was lost/unusable. Evaluated at both the near end and far end of the line.

LOSS_OF_LINK_SEC—the number of seconds in a given period where the link was entirely lost.

INIT_FULL_INITIAL—count of the number of attempted full initialisations in a given period. Full initialisations are attempted after synchronisation has been lost between the modem and the DSLAM to try to re-establish the link.

INITFAIL_FLD_FULL_INITIAL—count of the number of failed full initialisations in a given period.

SN_RATIO_MRGN—the ratio of the measured signal level to the observed noise level. It is measured for both the upstream and the downstream channels.

LINE_RATE—the actual line rate measured for both the upstream and the downstream channels.

UPTIME_TOT_SYNC_TIMEINSEC—the time (in seconds) that the link was synchronised in a given period.

Returning to the modelling method, only lines with downstream line attenuation greater than 0 dB and less than 60 dB are included. Lines where the downstream line attenuation is null should also be excluded. This is due to practical considerations involving the data collector in the DSLAMs where null is used to represent not valid data and maximum levels of around 60 dB are set for measurement by data collectors.

The data associated with each line is first separated out for each service profile as set out in Table 2 below according to average upstream and downstream line attenuation measurements for the line.

TABLE 2

| Profile | Line profile conditions |
|---|---|
| Max | UPSTR_LINE_RATE_AVG>288 and UPSTR_LINE_RATE_AVG<=448 |
| fixed half Mb | UPSTR_LINE_RATE_AVG<=288 AND DOWNSTR_LINE_RATE_AVG>288 AND DOWNSTR_LINE_RATE_AVG<=576 |
| fixed one Mb | UPSTR_LINE_RATE_AVG<=288 AND DOWNSTR_LINE_RATE_AVG>576 AND DOWNSTR_LINE_RATE_AVG<=1152 |
| fixed two Mb | UPSTR_LINE_RATE_AVG<=288 AND DOWNSTR_LINE_RATE_AVG>1152 AND DOWNSTR_LINE_RATE_AVG<=2272 |

So, each measured DSL line is categorised into one of the profiles set out in Table 2. For each of these profiles, we aggregate the measured data into individual categories according to the line parameter.

It should be noted that the profiles listed in Table 2 above are not exhaustive, and a person skilled in the art will appreciate that other profiles can be used. Similarly, the line profile conditions are illustrative and may vary in other systems.

The measured values for each parameter, such as DNSTR_LINE_ATTN or DOWNSTR_SN_RATIO_MRGN, are plotted against the upstream line attenuation. Plotting each of the parameters against the upstream line attenuation is based on the observation that the upstream line attenuation is fairly consistently proportional to the line length. This is advantageous, as the actual line length is not easily measured, but the upstream line attenuation is.

Figure 2:
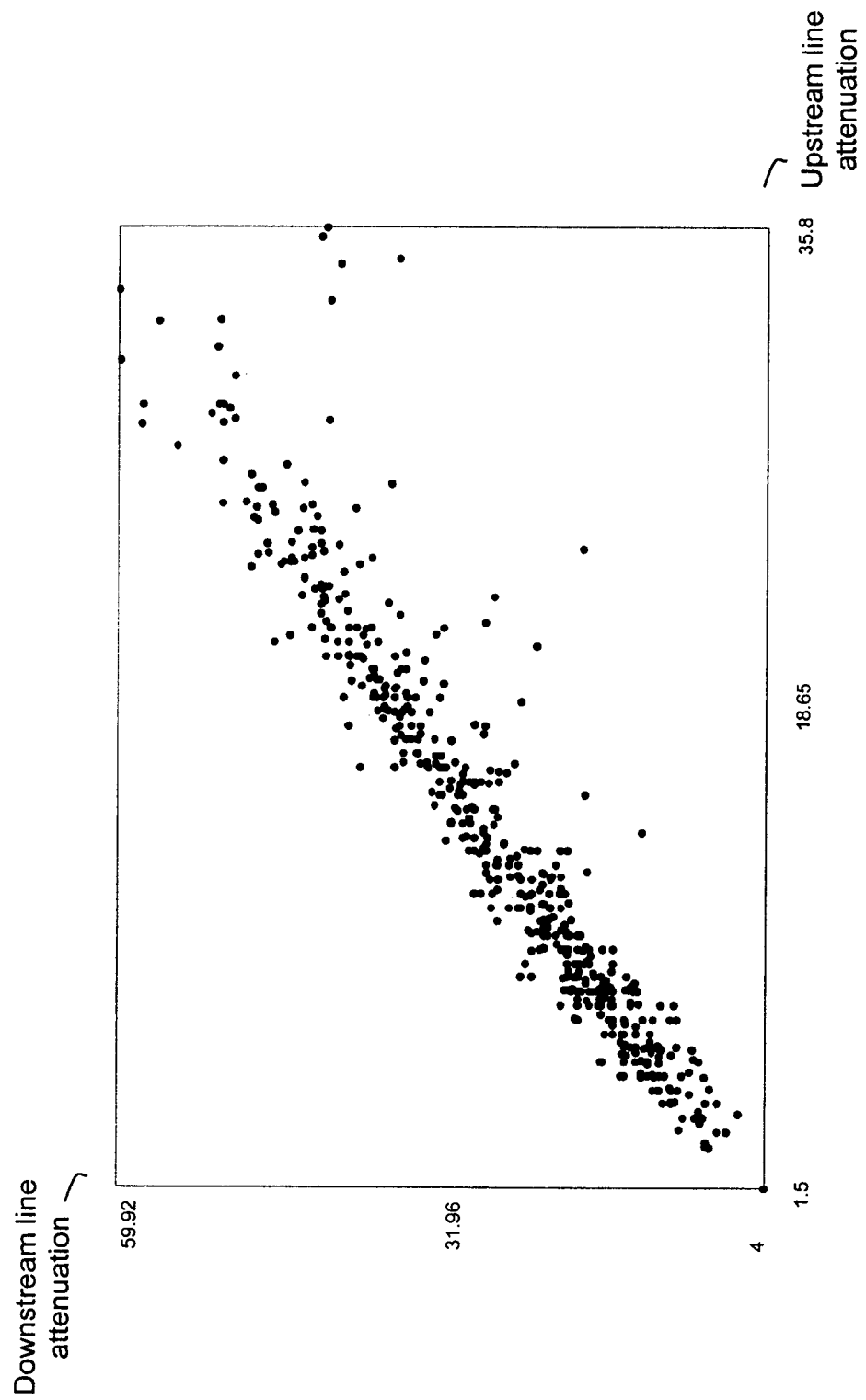
FIG. 2 is a graph of the downstream line attenuation plotted against the upstream line attenuation for generating a model in an example of the present invention.

FIG. 2 shows a graph of one of the measured parameters DNSTR_LINE_ATTN (downstream line attenuation), plotted against the upstream line attenuation for lines with a consumer max profile. Other parameters are plotted similarly against the upstream line attenuation.

Figure 3:
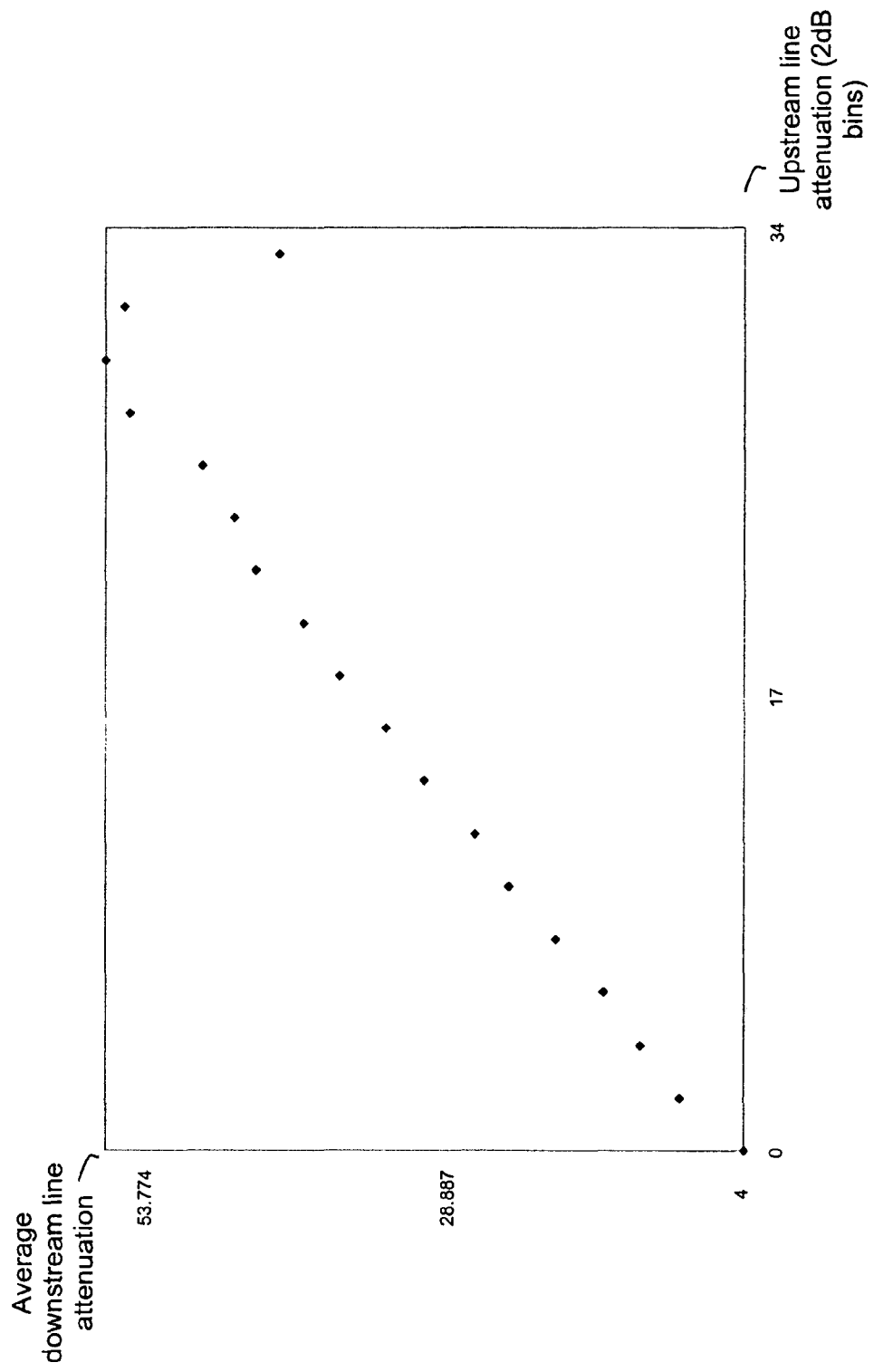
FIG. 3 is a graph of the average downstream line attenuation over fixed bins of the upstream line attenuation used in generating a model in an example of the present invention.

Then for each parameter, we split the upstream line attenuation into bins of a fixed width. In this example, the bin width is 2 dB. The average values for the parameter are calculated as well as the standard deviation. FIG. 3 shows a graph of the downstream line attenuation averaged over 2 dB bins of the upstream line attenuation.

However, as shown in Table 1, for some parameters no bin average is calculated, but instead the value is pegged at 0, which is the expected ideal value.

Figure 4:
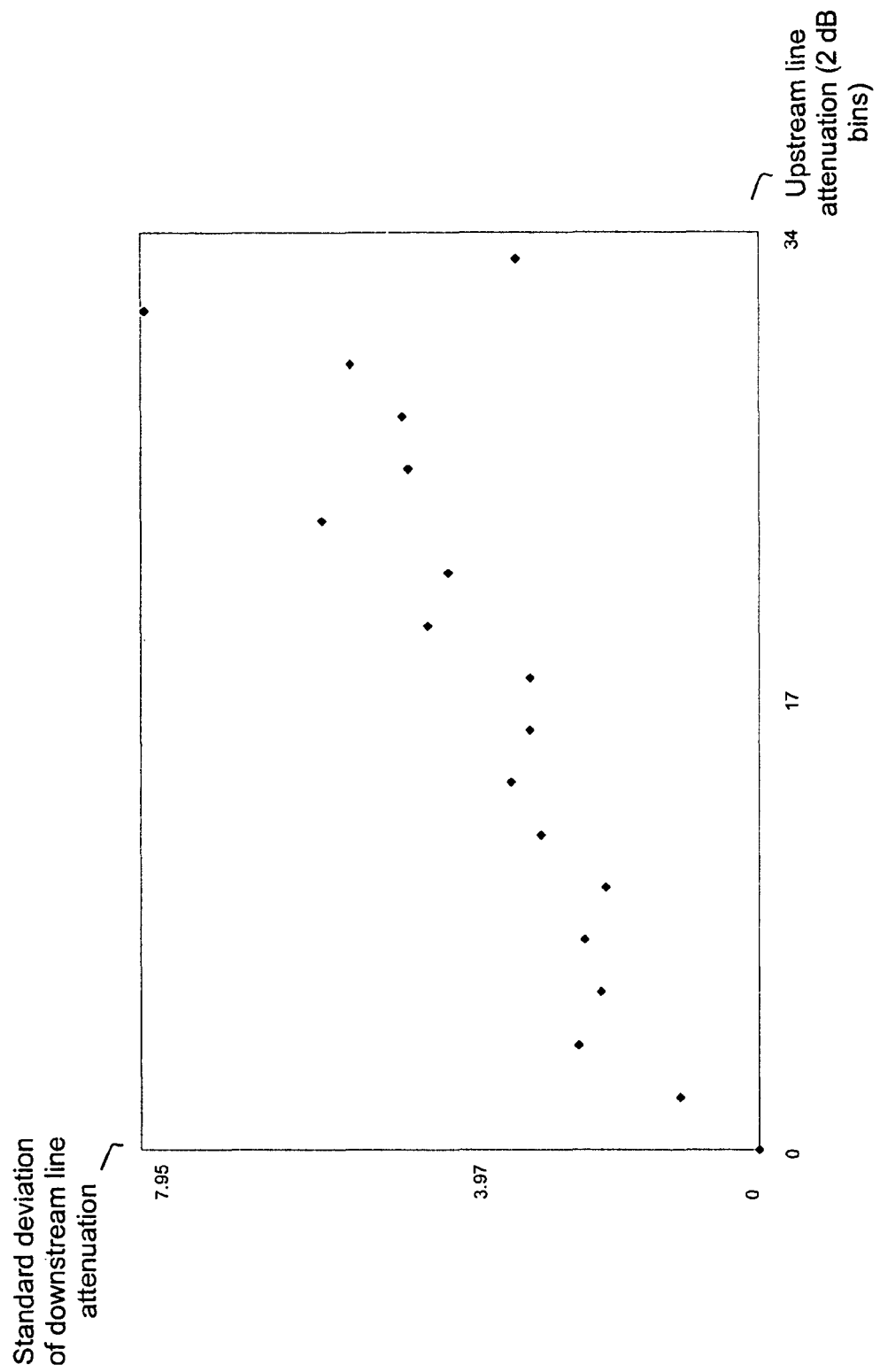
FIG. 4 is a graph of the standard deviation of the downstream line attenuation over fixed bins of the upstream line attenuation used for generating a model in an example of the present invention.

FIG. 4 shows a graph of the standard deviation of the downstream line attenuation plotted against the upstream line attenuation in 2 dB bins.

The method of generating individual line performance indicator models for each parameter uses linear regression analyses. Standard deviations use a one part linear fit (i.e. a linear regression fit). Average values are modelled using either one part or two part linear fits. For a two part linear fit the bin data are split into two parts and a regression fit run on each part. Table 3 below shows the fit types for each parameter.

The combined regression determinating coefficient is obtained by averaging the regression determinating coefficients from each part. The split point is varied throughout the range of bins and the best fit determined from the larger of the one part regression determinating coefficient or the split point with the largest combined regression determinating coefficient. If the maximum regression determinating coefficient is less than 0.7 the fit is not considered adequate and the parameter is dropped from the model (with a warning given).

TABLE 3

| Parameter name | Model fit type for average bins | Model fit type for standard deviation bins |
|---|---|---|
| DNSTR_LINE_ATTN | One or two part linear | One part linear |
| UPSTR_LINE_ATTN | Base | Base |
| DNSTR_MAX_ATTIN_DATARATE | One or two part linear | One part linear |
| UPSTR_MAX_ATTIN_DATARATE | One or two part linear | One part linear |
| CODE_VIO_LINE_NREND | fixed 0 | One part linear |
| CODE_VIO_LINE_FREND | fixed 0 | One part linear |
| FEC_SEC_LINE_NREND | fixed 0 | One part linear |
| FEC_SEC_LINE_FREND | fixed 0 | One part linear |
| LOSS_OF_FRM_SEC_FREND | fixed 0 | One part linear |
| LOSS_OF_FRM_SEC_NREND | fixed 0 | One part linear |
| LOSS_OF_LINK_SEC | fixed 0 | One part linear |
| INIT_FULL_INITIAL | fixed 0 | One part linear |
| INITFAIL_FLD_FULL_INITIAL | fixed 0 | One part linear |
| DOWNSTR_SN_RATIO_MRGN | One or two part linear | One part linear |
| UPSTR_SN_RATIO_MRGN | One or two part linear | One part linear |
| DOWNSTR_LINE_RATE | One or two part linear | One part linear |
| UPSTR_LINE_RATE | One or two part linear | One part linear |

This procedure results in a set of slope and intercept values for the average and standard deviations of each line parameter, allowing an estimated DSL parameter value (EV) and standard deviation (ES) to be evaluated for any given measured upstream attenuation.

The overall line performance indicator (LPI) for a line under test is calculated as the sum of the individual LPI contributions from each of the parameters used in the model evaluation. An individual LPI contribution is calculated as follows.

Firstly for a given line parameter, the measured parameter value (PV) and measured upstream attenuation (UA) are evaluated as an average value over the particular period of interest. These values may be measured by the line management module 110.

The expected parameter value EV and expected standard deviation ES are evaluated using the derived models parameters in conjunction with the measured upstream attenuation UA. The LPI partial contribution for each parameter is given by:

$$LPI(parameter) = abs(PV - EV)/ES \qquad (1)$$

In equation (1) above, the LPI(parameter) is effectively normalised by dividing by the standard deviation ES.

The overall LPI for the line being measured is then the sum of the individual LPIs for each parameter.

$$LPI(total) = \Sigma LPI(parameters) \quad (2)$$

In this way, the overall LPI value grows whenever any measured parameter value is far enough away from the EV as rated in units of ES for that specific upstream attenuation UA. This can offer complete coverage of all of the measured DSL parameters without giving undue importance to any specific parameter as each is normalised accordingly.

Calculation of specific expected values can be done in the following manner.

Expected standard deviations are represented as one part linear fits and thus:

$$ES = (slope \times UA) + intercept \quad (3)$$

where the slope and intercept come from the fit to the standard deviation bin data model for the line parameter.

Expected values are either a single fixed value, e.g. 0 for CODE_VIO_LINE_NREND or a linear fit for DOWNSTR_SN_RATIO_MRGN. Thus:

$$EV = (slope \times UA) + intercept \quad (4)$$

where the slope and intercept are those relevant to the value of UA (i.e. depending on the best split point) and the regression fit for the parameter.

Once, all the individual LPIs for a given line has been calculated, and the total LPI is determined by the line management module 110, a response can be triggered accordingly. For example, lines exhibiting a high LPI can be flagged for further investigation. Thresholds for the overall LPI value can be used to set limits on when lines should be flagged.

Whilst the above example describes the bulk of the calculation being carried out by the line management module 110 in the local exchange 106, a similar line management module could be located in the user's terminal equipment 102a for example, and the same method carried out there. Where necessary, some of the measurements required may have to be done at the DSLAM and the results passed down the line to the terminal equipment for processing.

It is noted herein that while the above describes examples of the invention, there are several variations and modifications which may be made to the described examples without departing from the scope of the present invention. One skilled in the art will recognise modifications to the described examples.

The invention claimed is:

1. A method of determining the performance of a digital subscriber line, the method comprising:
   i) generating, by a processor, a model for each of a plurality of data transmission parameters based on measurements taken from a plurality of digital subscriber lines, wherein each model models the relationship between a data transmission parameter as a function of the upstream line attenuation;
   ii) measuring the data transmission parameters and an upstream line attenuation associated with a test digital subscriber line;
   and for each of the measured data transmission parameters
      a) determining an expected value for the measured data transmission parameter corresponding to the measured upstream attenuation using the model associated with said measured data transmission parameter; and
      b) calculating a parameter performance indicator based on the difference between the expected value and the measured value for the measured data transmission parameter; and then
   iii) calculating a line performance indicator for the test digital subscriber line based on the sum of the parameter performance indicators for each of the measured data transmission parameters.

2. A method according to claim 1, wherein the parameter performance indicator is divided by the standard deviation of the expected value based on the model.

3. A method according to claim 1, wherein the models are grouped according to service profiles, wherein each service profile defines a set of line conditions associated with the digital subscriber line.

4. A method according to claim 1, wherein the values of the measured parameters in the models are separated into bins according to the measured upstream line attenuation.

5. A method according to claim 4, wherein the values in each bin are averaged and the averages are used to model the relationship between the associated data transmission parameter as a function of the upstream line attenuation.

6. A method according to claim 5, wherein regression analysis is used to model the average values for each data transmission parameter as a function of the upstream line attenuation.

7. A network analysis module for determining the performance of a digital subscriber line, the network module adapted to:
   generate a model for each of a plurality of data transmission parameters based on measurements taken from a plurality of digital subscriber lines, wherein each model models the relationship between a data transmission parameter as a function of the upstream line attenuation;
   receive data transmission parameters and an upstream line attenuation associated with a test digital subscriber line;
   and for each of the measured data transmission parameters
      a) determine an expected value for the measured data transmission parameter corresponding to the measured upstream attenuation using the model associated with said measured data transmission parameter; and
      b) calculate a parameter performance indicator based on the difference between the expected value and the measured value for the measured data transmission parameter; and
   calculate a line performance indicator for the test digital subscriber line based on the sum of the parameter performance indicators for each of the measured data transmission parameters.

8. The method according to claim 7, wherein the parameter performance indicator is divided by the standard deviation of the expected value based on the model.

9. The method according to claim 7, wherein the models are grouped according to service profiles, wherein each service profile defines a set of line conditions associated with the digital subscriber line.

10. The method according to claim 7, wherein the values of the measured parameters in the models are separated into bins according to the measured upstream line attenuation.

11. The method according to claim 10, wherein the values in each bin are averaged and the averages are used to model the relationship between the associated data transmission parameter as a function of the upstream line attenuation.

12. The method according to claim 11, wherein regression analysis is used to model the average values for each data transmission parameter as a function of the upstream line attenuation.

* * * * *